(12) United States Patent
Beck (10) Patent No.: US 9,752,639 B2
(45) Date of Patent: Sep. 5, 2017

(54) FLUIDS HAVING A CONTROLLED STRESS RESPONSE CHARACTERISTIC

(71) Applicant: PALO ALTO RESEARCH CENTER INCORPORATED, Palo Alto, CA (US)

(72) Inventor: Victor Alfred Beck, Menlo Park, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 26 days.

(21) Appl. No.: 14/752,495

(22) Filed: Jun. 26, 2015

(65) Prior Publication Data

US 2016/0377142 A1    Dec. 29, 2016

(51) Int. Cl.
*F16F 9/12* (2006.01)
*F16F 9/00* (2006.01)

(52) U.S. Cl.
CPC .............. *F16F 9/12* (2013.01); *F16F 9/006* (2013.01)

(58) Field of Classification Search
CPC .... C10M 171/001; H01F 1/447; B64C 25/58; F16D 57/002; F16F 9/12; F16F 9/30; F16F 9/53; F16F 9/3235; F16F 9/483; F16F 13/30; F16F 15/16; F16F 2224/041
USPC ........................................................ 182/293
See application file for complete search history.

(56) References Cited

U.S. PATENT DOCUMENTS

| 4,446,884 | A | * | 5/1984 | Rader, Jr. | ............... | B65H 75/38 |
| | | | | | | 137/355.23 |
| 4,503,952 | A | * | 3/1985 | Hesse | ................... | B60G 13/08 |
| | | | | | | 188/264 E |
| 2002/0171067 | A1 | * | 11/2002 | Jolly | .................. | C10M 171/001 |
| | | | | | | 252/570 |
| 2002/0179387 | A1 | * | 12/2002 | Orita | ........................ | E05F 5/10 |
| | | | | | | 188/290 |
| 2004/0099494 | A1 | * | 5/2004 | Hadden | ..................... | F16F 9/12 |
| | | | | | | 188/290 |
| 2006/0113154 | A1 | * | 6/2006 | Hayashi | ..................... | F16F 9/12 |
| | | | | | | 188/290 |
| 2006/0234572 | A1 | * | 10/2006 | Wagner | .................. | C08L 71/02 |
| | | | | | | 442/59 |
| 2009/0004413 | A1 | * | 1/2009 | Wagner | ..................... | B32B 5/22 |
| | | | | | | 428/34.1 |
| 2010/0221521 | A1 | * | 9/2010 | Wagner | ............... | B01F 17/0028 |
| | | | | | | 428/315.5 |

OTHER PUBLICATIONS

J. Ding, W. Li and S. Shen, "Research and applications of shear thickening fluids," Recent Patents on Materials and Science, vol. 4, No. 1, pp. 43-49, 2011.
(Continued)

*Primary Examiner* — Robert A Siconolfi
*Assistant Examiner* — San Aung
(74) *Attorney, Agent, or Firm* — Marger Johnson (57) ABSTRACT

A shear thickening fluid having a controlled stress response, in which various stress response characteristics, including, an onset stress, a boundary stress and a fractures stress, can be controlled. The stress response characteristics controlled by the controlled properties of the shear thickening fluid, including the viscosity of a fluid medium, the mechanical properties of the suspended particles and the mechanical properties of the fluid boundary.

21 Claims, 3 Drawing Sheets

(56) References Cited

OTHER PUBLICATIONS

N. Wagner and J. Brady, "Shear thickening in colloidal dispersions," Physics Today, pp. 27-32, 2009.
Brown, E; et al., "Generality of shear thickening in dense suspensions," Nature Materials, vol. 9, pp. 220-226, 2010.
E. Brown and H. Jaeger, "The role of dilation and confining stresses in shear thickening of dense suspensions," Journal of Rheology, 2012.
Kalman, DP et al., "Effect of particle hardness on the penetration behavior of fabrics intercalated with dry particles and concentrated particle-fluid suspensions," Applied Materials and Interfaces, vol. 1, No. 11, pp. 2602-2612, 2009.
OE Petel et al.,"The Effect of Particle Strenght on the Ballistic Resistance of Shear Thickening Fluids," Applied Physics Letters, vol. 102, p. 064103, 2013.

\* cited by examiner

FLUIDS HAVING A CONTROLLED STRESS RESPONSE CHARACTERISTIC

BACKGROUND

A shear thickening fluid, also known as a dilatant, is a non-Newtonian fluid that exhibits an increase in viscosity in response to an applied shear stress. In this class of fluids, the greater the magnitude of the applied stress, the more viscous the fluid becomes. In some cases, the stress response of the fluid causes that fluid to exhibit solid-like properties.

One of the common examples of such a fluid is a mixture of cornstarch and water. A mixture of cornstarch suspended in plain water creates a fluid having non-Newtonian characteristics and properties. Under normal conditions with minimal amounts of stress applied, the mixture acts as a fluid, exhibiting the traditional fluid-like characteristics, however, under increased amounts of stress, the mixture becomes more viscous and resisting the applied stress.

The stress response of a shear thickening fluid is completely passive, it does not require additional energy other than the force or stress imparted onto the fluid. An example application of a shear thickening fluid is the viscous coupling found in some automobile four-wheel drive systems. Rather than physically connecting two drive shafts, the drive shafts terminate in a shear thickening fluid filled unit, with each drive shaft having a set of closely space circular plates. Under normal driving, both the engine driven drive shaft and the free drive shaft rotate at the same speed since all wheels of the vehicle are rotating at the same speed. If the wheels attached to the free drive shaft begin to rotate slower due to slipping, the difference in rotational speeds between the driven and free drive shafts causes the shear thickening fluid to begin to thicken. The shear-thickened fluid effectively joins the two drive shafts, allowing power from the driven drive shaft to be transferred to the free drive shaft. This condition persists until the rotational speeds of the drive shafts is again matched after the slipping conditions have abated.

Current shear thickening fluids are used in situations like that described above. These situations typically only require that a fluid thickens at about a certain applied stress. The fluids are used in situations allowing for a certain level of inexactness, with the important characteristic being that the fluid thickens in response to an applied stress.

Therefore, the art could benefit from a shear thickening fluid in which the stress response characteristics can be controlled, such as the response of the fluid at various levels of applied stress.

DETAILED DESCRIPTION

Figure 1:
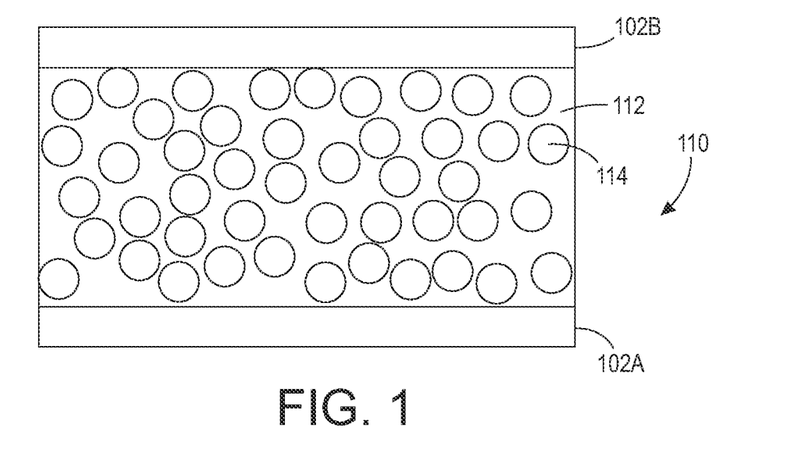
FIG. 1 is a cross-section showing a shear thickening fluid between two plates at rest.

FIG. 1 is a cross-section illustrating a shear thickening fluid 110 at rest between two plates 102a and 102b. The shear thickening fluid 110 includes the fluid matrix 112 in which a plurality of particles 114 are suspended. The particles 114 are distributed randomly in the fluid matrix 112 and remain in a particulate phase in which the majority of the particles 114 are not agglomerated into larger formations. The plates 102a and 102b are stationary with no force being imparted to the shear thickening fluid 110. In this state, the shear thickening fluid 110 exhibits traditional fluid properties.

Figure 2:
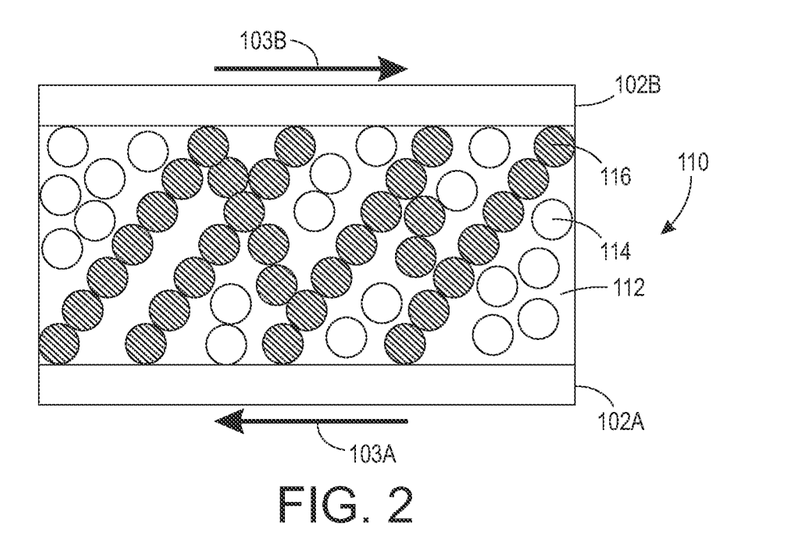
FIG. 2 is a cross-section showing the shear thickening fluid of FIG. 1 exhibiting a shear thickening response.

FIG. 2 is a cross-section illustrating a shear response of the shear thickening fluid shown in FIG. 1. The top plate 102b is displaced in a direction indicated by the arrow 103b opposite the direction of displacement of the bottom plate 102a, indicated by the arrow 103a. The counter-displacement of the plates 102a and 102b imparts a shear force on the shear thickening fluid 110 contained between the plates 102a and 102b.

In response to the applied shear force, the particles 114, within the fluid matrix 112 of the shear thickening fluid 110, contact each other and form force chains 116. The force chains 116 spread throughout the shear thickening fluid 110, spanning between the confining boundaries of the plates 102a and 102b. Particles 114 that are not part of a force chain 116 are free to move throughout the fluid matrix 112 of the shear thickening fluid 110. However, the motion of the free particles 112 is impeded by the formation of the force chains 116. The force chains 116 and the confining boundaries impede motion of the free particles 112 increasing the overall viscosity of the shear thickening fluid 110. The counter displacement of the plates 102a and 102b is hampered by the increase in viscosity of the intervening shear thickening fluid 110. If a larger force is applied to the plates, 102a and 102b, in an attempt to increase the rate or distance of displacement, the shear stress imparted to the shear thickening fluid 100 increases. The greater shear stress increases the formation of force chains 116 within the shear thickening fluid 110, further increasing the stress response, viscosity, of the fluid 110.

Once the shear stress applied to the shear thickening fluid 110 is removed, the force chains 116 quickly break down and the particles 114 return to individual suspension within the fluid matrix 112, like the particles shown in FIG. 1.

Figure 3:
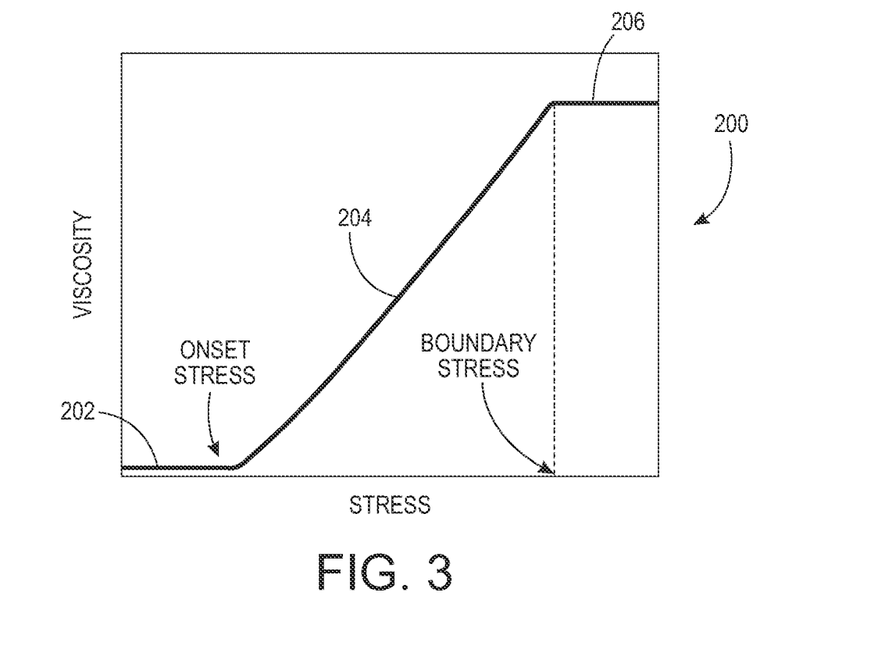
FIG. 3 is a graph plotting the stress response of the fluid of FIGS. 1 and 2.

FIG. 3 is a plot of the viscosity of a dilatant in response to an applied stress. The applied stress and resultant viscosity are plotted on a logarithmic scale. During an initial application of stress, 202, the viscosity of the fluid remains constant. At this point, the dilatant exhibits regular Newtonian fluid behavior, i.e., the viscosity of the liquid remains constant regardless of the magnitude of the stress applied to the fluid. However, in a dilatant or shear thickening fluid, the stress eventually reaches a point, an onset stress, at which the shear thickening behavior begins to be exhibited 204. At this point, the increasing stress applied to the dilatant results in the increasing viscosity of the fluid. The viscosity continues increasing with the stress, until eventually the stress applied on the fluid reaches a critical point, a boundary stress. At this point, the viscosity of the dilatant can no longer increase and the fluid again behaves as a Newtonian fluid, albeit one having an increased viscosity than initially exhibited. As the stress is increased past this point, the viscosity of the dilatant stays relatively constant 206.

The boundary stress is so called since this value is determined by the materials surrounding or containing the dilatant. In some examples, this can be the physical strength of the materials containing the dilatant. In others, the boundary stress can be a surface tension of a fluid interface.

The packing fraction, the volume occupied by the packed together particles, of the dilatant is one of the contributing factors to the shear thickening behavior of a dilatant. The higher the particle fraction, the greater the ratio of the volume of the packed particles to the overall volume of the dilatant. The high ratio indicates the dilatant has a high density or concentration of particles. A larger number of particles allows force chains to form more readily, and grow faster as particles are more easily recruited. In dilatants containing a lower particle fraction, force chains form more slowly as the recruitment of particles takes longer due to the lower particle quantity and concentration. Additionally, in lower particle fraction dilatants, the number of force chains forming is also decreased due to the lower quantity of particles available to form the force chain. The rate of force chain formation and growth influences the stress response of the dilatant. The stress response of the dilatant can be controlled by controlling the particle packing fraction.

In a high particle fraction dilatant experiencing a given stress, force chains form and grow rapidly. The interaction of the multiple force chains "thickens," i.e. increases the viscosity of, the dilatant. Due to the large number of particles within the dilatant, the force chains begin forming at a lower stress magnitude or onset stress and grow faster as the magnitude of stress is increased.

In a low particle fraction dilatant, experiencing the same magnitude of stress as above example, force chains form and grow proportionally slower. Due to the slower rate of formation, the interaction between force chains is limited in comparison to the high particle fraction dilatant, thus the "thickening" effect, or viscosity, of the fluid increases at a slower rate. Additionally, due to the lower quantity of particles, a higher magnitude onset stress can be required before the formation of force chains begins.

By controlling the particle fraction of the dilatant, the onset stress at which the fluid begins to exhibit thickening behavior can be varied and controlled. Additionally, the particle fraction can also affect the rate of the thickening of the dilatant. A model of the thickening behavior in relation to the particle fraction of the dilatant can be used to select a particle fraction based on a desired stress response of the dilatant.

In an embodiment, the stress response of the dilatant can be controlled through manipulation of the boundary stress. The boundary stress can be engineered or controlled by the strength or stiffness of the surrounding material, i.e., the dilatant containment vessel.

In this embodiment, the containment vessel is constructed of a material having a known and selected Young's or elastic modulus. Because the Young's modulus of the boundary is known, the vessel has a known stress or strain at which the sidewalls of the containment vessel begin to elastically deform. A dilatant within such a containment vessel and subjected to a stress exhibits a stress response that causes the viscosity of the fluid to increase. The Young's modulus of the sidewall material determines a stress magnitude at which the walls begin to deform.

As the dilatant experiences an applied stress, the fluid begins to thicken and transmit at least a portion of that stress into the walls of the containment vessel. As the viscosity of the dilatant increases, the imparted magnitude of stress from the fluid into the walls of the containment vessel approaches a threshold at which the walls of the containment vessel begin to elastically deform. Once that occurs, the walls of the containment vessel begin to elastically deform, preventing further stress from being applied to the contained dilatant. By diverting at least a portion of the stress imparted on the dilatant into the walls of the containment vessel, the stress response of the dilatant is stabilized and controlled, i.e., the viscosity is static and no longer increasing. At this point, the dilatant has a maximum viscosity as defined by the strength of the surrounding materials.

Using container materials having a high Young's modulus, such as steel, to construct the containment vessel shifts the boundary stress of a contained dilatant to an increased magnitude. If the container materials used have a low Young's modulus, such as a plastic, rubber, or foam, the boundary stress of the dilatant is lowered. In this manner, the maximum viscosity of the dilatant can be controlled.

The onset stress of the dilatant can also be controlled. By adjusting the size of the dilatant particles the stress at which the shear thickening behavior is initiated can be controlled. Larger particles require fewer particles to form a force chain of similar length than one composed of smaller particles. Additionally, the larger particles increase the stress within the dilatant more rapidly than a dilatant having smaller particles, again due to the rate and ease of formation of force chains within the dilatant. Through experimentation, the onset stress as a function of particle size for a dilatant can be determined. By controlling the particle size of the dilatant, a dilatant having a selected onset stress can be created.

Figure 4:
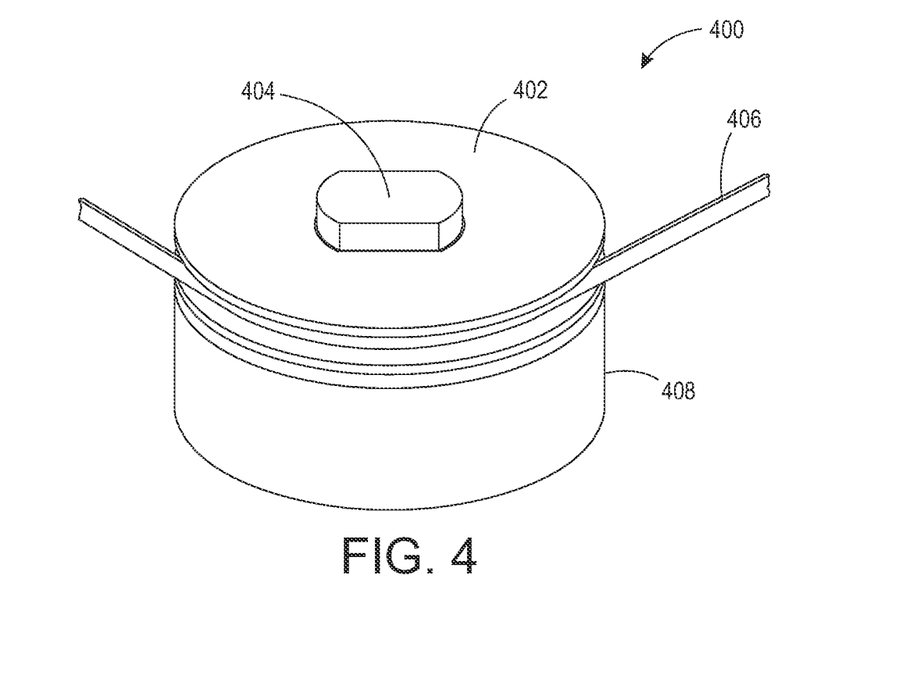
FIG. 4 is a rotary dashpot having a shear thickening fluid that has a controlled stress response.

FIG. 4 is an example rotary dashpot 400, in which a shear thickening fluid, dilatant, is contained. The rotary dashpot includes a top 402 having a groove through which a belt 406 is disposed, the top 402 engages a rotor 404 and sits atop a lower housing 408. As the top 402 of the rotary dashpot 400 rotates in response to the motion of the belt 406, it causes the rotor 404 to rotate within the lower housing 402. The angular acceleration and angular velocity of the rotor 404 caused by motion or displacement of the belt 406 causes a stress response to be exhibited by the contained dilatant. The stress response dilatant is an increased viscosity of the dilatant, which impedes the rotation of the rotor 404 of the dashpot 400. The impeded motion can slow or stop the rotation of the rotor 404.

Figure 5:
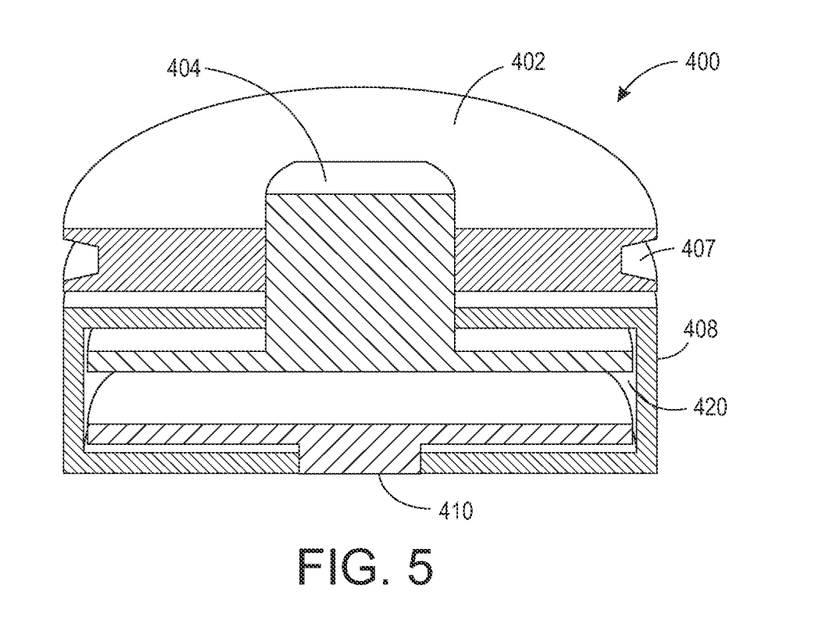
FIG. 5 is a cross-section of the rotary dashpot of FIG. 4

FIG. 5 is a cross section of the rotary dashpot 400 of FIG. 4. The rotor 404 is engaged and rotates with the top 402 as the belt, engaged with the groove 407, is displaced. A stator 410 is engaged with the lower housing 408 and remains stationary relative to the rotor 404. The lower housing 408 is filled with a dilatant 420 that surrounds a portion of the rotor 404 and the stator 410 located within the lower housing 408. As the top 402 and rotor 404 are rotated by the displacement of a belt (not shown) in the groove 407, a portion of the rotor 404 rotates in the dilatant 420 and relative to the stator 410 within the lower housing 408.

The dilatant 420 exhibits a shear thickening stress response at an onset stress magnitude. As the rotor 404 moves through the dilatant 420, the rotor 404 applies a magnitude of shear stress to the dilatant 420. If the applied magnitude of shear stress by the rotor 404 on the dilatant 420 remains below an onset stress magnitude, the viscosity of the dilatant 420 remains constant. At a stress level below an onset stress, the rotor 404 and engaged top 402 are allowed to freely rotate.

As the stress applied to the dilatant 420 by the rotor 404 increases, the magnitude of the stress surpasses the onset stress. Once the stress has exceeded the onset stress, the dilatant 420 begins to exhibit shear thickening behavior and the viscosity of the dilatant 420 increases. The viscosity of the dilatant 420 increases as the magnitude of stress imparted thereupon increases. The increasing viscosity of the dilatant 420 can be proportional to the increasing magnitude of stress.

Eventually, as the stress applied to the dilatant 420 increases, the dilatant reaches a boundary stress as defined by the material properties of the surrounding housing 408 and stator 410. Once the magnitude of imparted stress reaches the boundary stress, the shear thickening behavior of the constrained dilatant 420 ceases and the dilatant 420 exhibits normal Newtonian properties in which the viscosity of the fluid remains constant regardless of any further stress applied. A larger magnitude of an applied stress on the dilatant 420 past the boundary stress level does not result in an increase of viscosity of the dilatant 420.

The rotation of the rotor 404 is dampened by the changing viscosity of the dilatant 420. The drag of the increased viscosity of the dilatant 420 on the rotor 404 can slow the rotation speed of the rotor 404 or increase the effort or force required to maintain the rotor at a rotational speed.

Using the boundary stress threshold to control the stress response of the contained dilatant 420 allows the maximum viscosity of the dilatant 420 to be preset. In this manner, the maximum drag, or braking effect, of the dilatant 420 on the rotation of the rotor 404 can be engineered or controlled.

In a further embodiment, the boundary stress of the dilatant 420 can be controlled by the physical displacement of a containment surface rather than or in addition to relying on the material properties of the containment vessel. For example, a surface constraining the dilatant 420 can be engineered to displace at a desired applied shear stress.

In this embodiment, the rotor 404 or stator 410 can be sprung by a spring (not shown) at the selected shear stress. The spring exerts a restraining force on the rotor 404 or stator 410, which prevents displacement of the rotor 404 or stator 410 under a stress. The spring can be positioned between the stator 410 and the base of the lower housing 408 and wrapped around a shaft of the stator 410. The load on the stator 410 is caused by the shear thickening response of the dilatant 420. As the force of the load increases, this force can overcome the restraining force of the spring, causing the distance between the stator 410 and the base of the lower housing 408 to decrease. Decreasing the distance between the stator 410 and the base of the lower housing 408 causes the distance between the stator 410 and rotor 404 to increase thereby increasing the volume in which the dilatant 420 is constrained. The stator 410 can continue to be displaced as the exerted force from the thickening dilatant 420 increases, the increasing displacement mitigating the increasing exerted force.

The ability for the stator 410 to displace under a known stress level effectively dictates the boundary stress plateau for the dilatant 420. The boundary stress of the dilatant 420 stays at this plateau for as long as the stator 410 displaces under the load. Eventually, the spring becomes fully compressed or close to fully compressed, preventing further displacement of the stator 410. As the stator 410 becomes stationary once again, the boundary stress of the dilatant 420 commensurately increases to the boundary stress level as dictated by the material properties of the housing 408, the stator 410 and the rotor 404.

Alternatively, the spring can also be affixed to the rotor 404, which allows the rotor to displace in a manner similar to the stator 410 as discussed above. The spring can be placed between the displacing rotor 404, the stator 410 and a sidewall of the lower housing 408. Alternatively, the spring can be placed outside the lower housing 408 and affixed to the shaft of the rotor 404 or stator 410. Further, one or more springs can be included and affixed to the rotor 404 and/or stator 410, allowing one or both to displace. The springs can have the same or differing spring constants to achieve the desired displacement parameters. One or more springs can also be included on the rotor 404 or stator 410 to allow for a variable displacement force profile, i.e., an initial displacement force that can become a second distinct displacement force when the displacing surface encounters a second spring.

One or more sidewalls of the housing 408 can also be sprung, in another example, rather or in addition to the sprung rotor 404 and/or stator 410. The ability to mix and match springs having a spring constant with the various surfaces of the device 400 allows for the selection of specific displacement characteristics that correspond to desired controlled stress responses of the contained dilatant 420.

As the rotor 404 is rotated through the dilatant 420, the dilatant undergoes a stress response that causes the viscosity to increase. The increased viscosity of the dilatant 420 exerts force on the rotor 404 and stator 410. If the rotor 404 and/or stator 410 are sprung, rather than being rigidly positioned, the force exerted on either of the spring-loaded rotor 404 or stator 410 by the dilatant 420 can increase to a stress magnitude that causes the rotor 404 or stator 410 to displace. That is, the force exerted by the dilatant 420 can reach a magnitude that overcomes the restraining force of the spring retaining the rotor 404 and/or stator 410. At this point, the rotor 404 and/or stator 410 begin to displace in response to the exerted force which defines the boundary stress of the dilatant 420. The boundary stress of the dilatant 420 is defined by the counter force that can be exerted by the container In this manner, the spring(s) can be selected to exert a desired restraining force on the rotor 404 and/or stator 410, the selected restraining force of the spring determining a boundary stress of the dilatant 420.

The example rotary dashpot shown in FIG. 4 can act as a speed governor. A belt engaged with the groove 407 of the top 402 is affixed to a rotating shaft. As the rotational speed of the shaft increases, so does the speed of the affixed belt. As the speed of the belt increases, it rotates the top 402 and engaged rotor 404 at a higher speed. The increased rate of rotation of the rotor 404 imparts a larger shearing force on the surrounding dilatant 420. As a result, the shear response of the dilatant 420 is larger and the viscosity of the fluid increases and resists the increased rotational rate of the rotor 404. The damping effect of the dilatant 420 on the rotational speed of the rotor 404 prevents increased and sudden onset of increased rotational speed of the rotor 404. Using a shear thickening fluid or dilatant 420 having a controlled stress response, as described herein, allows a user to select specific and desired stress response characteristics for the fluid to be used in a situation. In an example embodiment, the maximum viscosity of the dilatant 420 within the dashpot 400 can be selected at a desired value using the various ways as described.

In varying the specification of the constituent components of the dilatant fluid, as discussed in this disclosure, it is possible to achieve a controlled stress response of the fluid. That is, it is possible to create a shear thickening fluid in which the viscosity can be controlled at a selected stress level(s). By controlling the shear response of the dilatant, the fluid can be engineered for specific applied stress situations.

In another embodiment, the stress response of a dilatant can be controlled by engineering the suspended particles of the dilatant. In this manner, the stiffness and strength of the particles can be engineered to achieve desired stress response characteristics in the dilatant.

Engineering the stiffness of the particles controls the stress response of the dilatant by controlling the boundary stress. As discusses above, the boundary stress of the dilatant is defined as the magnitude of stress past which the viscosity of the dilatant no longer increases. Past the boundary stress point the dilatant no longer exhibits shear thickening behavior and will instead react as a Newtonian fluid having a constant viscosity. In the examples mentioned above, the boundary stress is determined by the rigidity or stiffness of the containment vessel as it was assumed that the suspended particles were more rigid or stiff than the sidewalls, i.e., the Young's modulus of the particle material is higher than that of the containment vessel material. In this embodiment, the boundary stress of the dilatant is determined by the rigidity or stiffness of the suspended particles. If the particle material has a lower Young's, elastic, modulus than that of the surrounding material, the Young's modulus of the particle material determines the boundary stress of the dilatant. The boundary stress of the dilatant can be determined by the lowest Young's modulus of the materials of the dilatant and containment vessel.

As the dilatant experiences a shear force, the particles of the dilatant flocculate into force chains. The imparted stress of the dilatant is transmitted through the force chains and into the containment boundaries. The particles of the dilatant have a known Young's modulus, by knowing the particle size, a deformation stress for the particles can be determined. In this manner, the deformation of the particles is dependent on the ratio of the fluid stress to the Young's modulus of the material. As the stress on the force chains of the dilatant increases, the particles comprising the force chain begin to deform. The stress at which the particles deform is the boundary stress of the dilatant. The deformation of the particles causes the collapse of the force chain, which prevents the stress within the dilatant from increasing further. Since the particle deformation occurs at a stress that is quickly relieved with the collapse of the force chain, the particles undergo predominately elastic deformation. This deformation type allows the particles to return to an initial state and shape once the stress on the particles is relieved. The particles from the collapsed force chain can then be recruited in the formation of new force chains. The collapse and formation of force chains, due to particle deformation, stabilizes the boundary stress of the dilatant.

Selecting harder substances, like metals or ceramics, for the particle material results in a dilatant having a high boundary stress. A softer substance, like plastics, used to make the particles causes the dilatant to have a low boundary stress. By selecting the particle material based on material properties, the stress response of a dilatant can be controlled by engineering a boundary stress of the fluid.

In a further embodiment, particles composed of multiple materials, which may have several different Young's moduli, can be used in the dilatant. A dilatant containing such multi-materials particles has an average Young's modulus. The average Young's modulus can allow a specific boundary stress to be engineered using mix of materials rather a singular material having the required material properties. The average Young's modulus of the can be precisely controlled by selecting the combination and relative concentration of the multi-material particles.

Alternatively, the dilatant can be engineered such that it exhibits shear thickening behavior until a prescribed stress magnitude is reached. In such a dilatant, the fluid is subjected to a stress and responds by exhibiting shear thickening behavior. The dilatant continues to exhibit such behavior as the stress is increased. At a pre-selected threshold stress or "fracture stress" the fluid no longer behaves as a shear thickening fluid.

Figure 6:
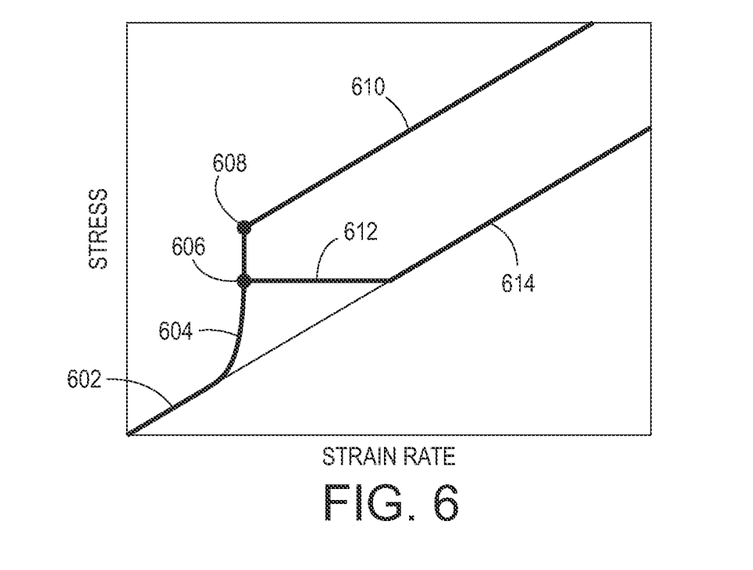
FIG. 6 is a graph of the controlled stress response of an example shear thickening fluid with a controlled stress response.

FIG. 6 illustrates a plot of the stress versus the strain rate for two dilatants, one having a controlled stress response, such as those discusses throughout this application, and the other a standard shear thickening fluid response. The plot illustrates the stress of the fluid as a function of the strain rate of the fluid, both plotted on a logarithmic scale. Initially, both dilatants follow the same initial response 602. Through the initial stress response 602, the stress of the fluids is proportional to the strain rate which indicates the dilatants are exhibiting Newtonian fluid behavior.

As the strain rate increases, both the standard shear thickening fluid and the disclosed controlled response shear thickening fluid reach an onset stress and transition into non-Newtonian, shear thickening behavior 604.

The normal dilatant continues to undergo shear thickening behavior until a boundary stress is reached at 608. Past this stress level 608, the dilatant returns to Newtonian fluid behavior 610, where the stress of the fluid is proportional to the strain rate of the fluid. That is the viscosity of the dilatant is stable and not increasing.

The disclosed controlled stress response dilatant reaches a pre-selected stress 606 and then maintains that stress until the dilatant returns to Newtonian behavior 614. In this example, the boundary stress 606 of the discloses controlled stress response dilatant is lower than the boundary stress 608 of the standard shear thickening fluid although it may be equal to the boundary stress 608 of the standard shear thickening fluid in other examples. The controlled stress response dilatant exhibits Newtonian behavior 614, where the stress of the fluid is proportional to the strain rate which indicates a static viscosity of the liquid. The viscosity of the dilatant during this phase 614 is the same as the viscosity of the suspension fluid of the dilatant. That is the particles of the dilatant are no longer capable of forming force chains or otherwise influencing the viscosity of the dilatant so the overall viscosity is that of the suspension fluid. The suspension fluid fraction dominates the dilatant during the phase 614.

The pre-selected boundary stress of the controlled stress response dilatant 606 is a fracture stress, so named because the dilatant particles are engineered to fracture and degrade at this stress magnitude. This stress magnitude triggers the breakdown of the dilatant particles which halts the shear thickening behavior of the fluid. Once the break down or degradation of the dilatant particles is complete, the viscosity of the dilatant is approximately the viscosity of the suspension fluid.

In an embodiment, the fracture stress 606 of the particles of the controlled stress response dilatant can be engineered and controlled to a specific stress magnitude resulting in a dilatant having a controlled stress response.

In an example, the particles of the dilatant are selected to have material properties, including a stress magnitude at which the particles fracture. This stress magnitude is the fracture stress of the dilatant in which the particles are suspended. Once the stress within the dilatant reaches the fracture stress level, the particles within the dilatant start to fracture into smaller particles. The fracturing of the dilatant particles into smaller particles decreases the packing fraction of the particles within the dilatant. The packing fraction is the ratio of the volume of the particles to the volume of the suspension fluid. This "packing fraction" means that the volume of the particles is not measured as the absolute volume of the particles, rather it is the volume of the particles when packed together such that every particle is touching at least one other particle and they are packed in the most efficient manner. The absolute volume of the particles does not change as the particles are fractured or broken-down. However, the overall volume occupied by the particles does decrease as the smaller particles are able to pack more densely. As described above, the packing fraction of the particles within the dilatant dictates many of the properties of the dilatant, such as the onset stress and the rate of the shear thickening behavior.

The smaller, fractured particles lower the packing fraction of the particles within the dilatant. The lower packing fraction makes the formation and maintenance of force chains less likely, hence the decrease in the shear thickening behavior of the dilatant. Eventually a point is reached where the packing fraction of the particles is so small that the properties of the suspension fluid dominate and the viscosity of the dilatant becomes that of the suspension fluid.

After the particles are broken down to a small packing fraction, the resultant solution can be shear thinning. In this state, the viscosity of the liquid actually decreases in response to a shear stress. To achieve such a fluid, the suspension solution of the dilatant is a shear thinning fluid that behaves as a shear thickening fluid when a sufficient packing fraction of particles is achieved within the solution. This potentially allows a fluid to behave as a dilatant initially, resisting movement through the fluid until a pre-scribed stress is reached within the fluid, at which point the fluid transitions from a shear thickening one to a shear thinning one. In the shear thinning fluid, motion through the fluid is made easier the greater the shear stress induced in the fluid.

In another embodiment, the varying packing fraction of the particles of the dilatant can be controlled by the structure of the particles. Instead of solid particles that fracture at a given stress, the particles can be hollow shells composed of a selected material, the shells of the particles fracturing at a given fracture stress. The fractured particle shells reduce the packing fraction of the particles and control the stress response of the dilatant.

The hollow particles can also have one or more opening which allows the fluid medium to penetrate and fill the hollow interior. Allowing the fluid medium to flow into the hollow particles can make the particles neutrally buoyant so that they remain suspended in solution rather than float as might happen given their hollow nature.

An example shell particle can be a hollow glass sphere. The hollow glass spheres suspended in a solution create a dilatant having similar properties to a dilatant having solid glass spheres. With the substitution of hollow glass spheres however, the fracture stress of the dilatant can be engineered or controlled by weakening or strengthening the particle shell and by controlling the type and volume of fluid that can fill the interior, if any. The use of shell particles can make the creation of particles having a selected or desired fracture stress easier than material selection and testing to achieve the required fracture stress. The glass particle shell thickness can be altered by etching the glass spheres, using an acid, to thin the shell of the particles to a desired thickness.

A dilatant containing engineered particles such as those discussed above can be used in conjunction with the rotary dashpot 400 of FIGS. 4 and 5, also previously discussed. In an example, a dilatant 420 having an engineered fracture stress is enclosed within the housing 408. The dilatant exhibits shear thickening behavior, resisting the motion of the rotor 404 through the dilatant 420. At the selected fracture stress, the engineered particles within the dilatant 420 breakdown, allowing the rotor 404 to rotate more freely through the now Newtonian fluid 420. In this example a large torque is required to rotate to the rotor 404 through the dilatant. At a threshold torque, corresponding to the engineered fracture stress of the dilatant 420, the particle break down is initiated. As the particles break down, the torque required to rotate the rotor 404 through the fluid 420 is lessened. In this example, the dilatant acted as an engineered torque limit in the rotary dashpot 400.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A shear thickening fluid having a controlled stress response, the controlled stress response having a controllable onset stress at which an onset viscosity of the shear thickening fluid begins to increase in response to an applied shear stress and a controllable boundary stress at which a boundary viscosity of the shear thickening fluid reaches a maximum viscosity in response to the applied shear stress, the shear thickening fluid, comprising:
 a fluid medium comprising at least one fluid and a plurality of particles;
 the fluid medium having a fluid medium characteristic;
 the plurality of particles suspended in the fluid medium, the plurality of particles having a particles characteristic;
 a boundary enclosing the fluid suspended in the fluid medium, the boundary having a boundary characteristic;
 wherein at least one of the fluid medium characteristic, the particles characteristic and the boundary characteristic are selected based on at least one of a preselected magnitude of the controllable onset stress and a preselected magnitude of the controllable boundary stress of the shear thickening fluid; and
 wherein at least one of the plurality of particles has the particles characteristic comprising a hollow interior surrounded by a shell having a thickness.

2. The shear thickening fluid of claim 1, wherein at least one of the fluid medium characteristic is a viscosity of the fluid medium.

3. The shear thickening fluid of claim 1, wherein at least one of the particles characteristic is a diameter of the particles.

4. The shear thickening fluid of claim 3, wherein the diameter of the particles is substantially the same for each of the plurality of particles.

5. The shear thickening fluid of claim 3, wherein the diameter of the particles is variable for each of the plurality of particles.

6. The shear thickening fluid of claim 1, wherein at least one of the particles characteristic is a particle fraction of the shear thickening fluid.

7. The shear thickening fluid of claim 1, wherein at least one of the particles characteristic is an elastic modulus of the particles.

8. The shear thickening fluid of claim 1, wherein the particles characteristic includes the thickness of the shell.

9. The shear thickening fluid of claim 1, wherein the shell of each of the plurality of particles includes silica glass formed using an acid etch process.

10. The shear thickening fluid of claim 1, wherein multiple openings are disposed across the shell of each of the particles, the openings structured to have fluid communication between the fluid medium and the hollow interior of each of the particles.

11. The shear thickening fluid of claim 1, wherein each of the plurality of particles is composed of a material having mechanical properties that includes a fracture stress and an elastic modulus, and wherein at least one of the particles characteristic includes the material.

12. The shear thickening fluid of claim 1, wherein each of the plurality of particles includes silica glass.

13. The shear thickening fluid of claim 1, wherein at least one of the boundaries is a boundary fluid enclosing the shear thickening fluid.

14. The shear thickening fluid of claim 1, wherein at least one of the boundaries is a housing enclosing the shear thickening fluid and the housing is composed of a material having low elastic modulus.

15. The shear thickening fluid of claim 14, wherein the housing includes at least a sprung surface, the sprung surface varying a volume of the housing in response to the applied shear stress.

16. A rotary dashpot, comprising:
at least one housing including side walls and enclosing:
 a shear thickening fluid having a controlled stress response, the controlled stress response having a controllable onset stress at which an onset viscosity of the shear thickening fluid begins to increase in response an applied shear stress and a controllable boundary stress at which a boundary viscosity of the shear thickening fluid reaches a maximum viscosity in response to the applied shear stress;
 a rotor structured to at least partially rotate within the shear thickening fluid; and
 a stator disposed opposite the rotor and forming at least one of the boundaries enclosing the shear thickening fluid;
wherein, when the rotor rotates within the shear thickening fluid, the rotation of the rotor in the shear thickening fluid applies the shear stress to the shear thickening fluid, the shear thickening fluid including:
 a fluid medium comprising at least one fluid and a plurality of particles;
 the fluid medium having a fluid medium characteristic;
 the plurality of particles suspended in the fluid medium, the plurality of particles having a particles characteristic;
 at least one of the housing, the rotor and the stator having a boundary characteristic;
 wherein at least one of the fluid medium characteristic, the particles characteristic and the boundary characteristic are selected based on at least one of a preselected magnitude of the controllable onset stress and a preselected magnitude of the controllable boundary stress; and
 wherein at least one of the plurality of particles has a hollow interior surrounded by a shell having a thickness.

17. The rotary dashpot of claim 16, wherein at least one of the boundary characteristic is the elastic modulus of a material of one or more of the housing, the rotor and the stator in contact with the shear thickening fluid.

18. The rotary dashpot of claim 16, wherein at least one of the boundary characteristic is at least a sprung surface in one or more of the housing, the rotor and the stator in contact with the shear thickening fluid, the sprung surface displacing in response to the applied shear stress.

19. The rotary dashpot of claim 16, wherein the particles characteristics includes the thickness of the shell.

20. The rotary dashpot of claim 16, wherein each of the plurality of particles are composed of a particles material having mechanical properties including a fracture stress and an elastic modulus and wherein at least one of the particles characteristic includes the particles material.

21. The rotary dashpot of claim 20, wherein the shear thickening fluid transitions to a shear thinning fluid in response to the applied shear stress exceeding the fracture stress of the particles.

* * * * *